(12) United States Patent
Chandhoke et al.

(10) Patent No.: US 8,938,559 B2
(45) Date of Patent: Jan. 20, 2015

(54) ISOCHRONOUS DATA TRANSFER BETWEEN MEMORY-MAPPED DOMAINS OF A MEMORY-MAPPED FABRIC

(71) Applicant: National Instruments Corporation, Austin, TX (US)

(72) Inventors: Sundeep Chandhoke, Austin, TX (US); Jason D. Tongen, Austin, TX (US)

(73) Assignee: National Instruments Corporation, Austin, TX (US)

( * ) Notice: Subject to any disclaimer, the term of this patent is extended or adjusted under 35 U.S.C. 154(b) by 57 days.

(21) Appl. No.: 13/645,864

(22) Filed: Oct. 5, 2012

(65) Prior Publication Data

US 2014/0101347 A1    Apr. 10, 2014

(51) Int. Cl.
*G06F 13/28*    (2006.01)

(52) U.S. Cl.
USPC ............... 710/26; 710/22; 710/27; 710/242; 710/311; 710/316; 709/222; 709/223; 709/224; 370/230; 370/468

(58) Field of Classification Search
USPC .............................. 710/242, 311, 316, 26, 27; 709/222–224; 370/230, 468
See application file for complete search history.

(56) References Cited

U.S. PATENT DOCUMENTS

| | | | |
|---|---|---|---|
| 7,808,895 B2* | 10/2010 | Nalawadi et al. | 370/230 |
| 8,407,377 B1* | 3/2013 | Shapiro et al. | 710/23 |
| 8,473,661 B2* | 6/2013 | Chou et al. | 710/242 |
| 8,583,957 B2* | 11/2013 | Chandhoke et al. | 713/401 |
| 8,589,723 B2* | 11/2013 | Kumar et al. | 714/4.5 |
| 2006/0190655 A1 | 8/2006 | Kautzman et al. | |
| 2011/0238909 A1* | 9/2011 | Kumar et al. | 711/114 |
| 2012/0030495 A1 | 2/2012 | Chandhoke et al. | |
| 2014/0075235 A1* | 3/2014 | Chandhoke et al. | 713/401 |

OTHER PUBLICATIONS

"PCI Express Peer-to-Peer Interconnect;" GE Intelligent Platforms, Mar. 2011, retrieved from <http://www.ge-ip.com/userfiles/file/pci_express_peer-to-peer_interconnect_wp_gft804.pdf?cid=GlobalSpec> on Jan. 9, 2013; pp. 1-10.

(Continued)

*Primary Examiner* — Tammara Peyton
(74) *Attorney, Agent, or Firm* — Meyertons Hood Kivlin Kowert & Goetzel, P.C.; Jeffrey C. Hood; Michael B. Davis

(57) ABSTRACT

Techniques for isochronous data transfer between different memory-mapped domains in a distributed system. A method includes configuring an isochronous engine with an isochronous period. The method further includes transferring data over a memory-mapped fabric from a first memory to a second memory during a specified portion of a cycle of the isochronous period. The first memory is comprised in a first device in a first memory-mapped domain of the memory-mapped fabric and the second memory is comprised in a second device in a second memory-mapped domain of the memory-mapped fabric. The method may further comprise translating one or more addresses related to the transferring. The memory-mapped fabric may be a PCI-Express fabric. The transferring may be performed by a DMA controller. A non-transparent bridge may separate the first and the second memory-mapped domains and may perform the translating.

28 Claims, 13 Drawing Sheets

(56) References Cited

OTHER PUBLICATIONS

"Non-Transparent Bridging Simplified;" PLX Technology, Inc., Apr. 2005, retrieved from <http://www.plxtech.com/files/pdf/technical/expresslane/NTB_Brief_April-05.pdf> on Jan. 9, 2013; pp. 1-4.

"Real-Time Networking with Reflective Memory;" GE Intelligent Platforms, Jan. 2010, retrieved from <http://defense.ge-ip.com/library/detail/11902> on Jan. 9, 2013; pp. 1-10.

"Reflective Memory Optimization Realized Through Best Practices in Design;" GE Intelligent Platforms, Jun. 2011, GFT-814, retrieved from <http://www.ge-ip.com/library/detail/12929> on Jan. 10, 2013; pp. 1-9.

* cited by examiner

ISOCHRONOUS DATA TRANSFER BETWEEN MEMORY-MAPPED DOMAINS OF A MEMORY-MAPPED FABRIC

FIELD OF THE INVENTION

The present invention relates to the field of networked devices, and, more particularly, to isochronous data transfer between different memory-mapped domains in a memory-mapped fabric.

DESCRIPTION OF THE RELATED ART

PCI (Peripheral Component Interconnect) was originally designed as an interconnect for personal computers (PCs). Because of the architecture of PCs, only one processor can typically control the system. If a second processor is added, the system operation would fail as both processors attempt to service the system requests. Distributed computing is gaining in popularity, and some switched fabric specifications, e.g., PCI-Express (PCIe) specifications, allow cabled interconnects, and so there is a need to allow multiple processors to connect to each other over the fabric, e.g., using PCI-Express. In this configuration, the two systems reside in different domains, but need to transfer data over the fabric, e.g., over a PCIe memory-mapped fabric between different memory-mapped domains.

Typically a non-transparent bridge (NTB) switch functions as a gateway between processor domains. It isolates intelligent (processor based) sub systems from each other by masquerading as endpoints to discovery software and translating the addresses of transactions that cross the bridge. It hides the devices connected to each intelligent system from each other (FIG. 5). The translation enables one host controller to write or read data from a second host controller. However this model is typically limited to host initiated transfers only. The host has to read or write to the translated address explicitly to trigger the translation. Alternatively, direct memory access (DMA) controllers on either side of the switch can be implemented to drive the transfers, but these controllers may also need to be initiated by the host controllers. Such methodologies may be satisfactory for asynchronous or data driven transfer models, but may be unsatisfactory for isochronous or time-based transfer models because they suffer from low predictability and depend on software executing on a host controller.

SUMMARY OF THE INVENTION

Various embodiments of a system and method for isochronous data transfer between different memory-mapped domains in a distributed system are presented below.

In one embodiment, a method may include configuring an isochronous engine with an isochronous period. The method may further include transferring data over a memory-mapped fabric, e.g., a PCI-Express fabric, from a first memory to a second memory during a specified portion of a cycle of the isochronous period, where the first memory is included in a first device in a first memory-mapped domain of the memory-mapped fabric and the second memory is included in a second device in a second memory-mapped domain of the memory-mapped fabric.

The method may further include repeating the transfer one or more times in an iterative manner to transfer successive data over the memory-mapped fabric from the first memory to the second memory during the specified portion of successive cycles of the isochronous period. The method may further include configuring the isochronous engine with other isochronous periods, and transferring data to the second device and/or to other devices in the second memory-mapped domain or other memory-mapped domains. The first and second devices and the isochronous engine may be synchronized to a global time.

An apparatus may include at least one I/O port configured to couple to a memory-mapped fabric and a processing element, coupled to the at least one I/O port, configured to implement an isochronous engine. The isochronous engine may be configured to initiate a transfer of data over the memory-mapped fabric from a first memory to a second memory, at a specified point within a cycle of an isochronous period, where first memory is included in a first device in a first memory-mapped domain of the memory-mapped fabric and the second memory is included in a second device in a second memory-mapped domain of the memory-mapped fabric.

The apparatus may further include a DMA controller, and the isochronous engine may be configured to control the DMA controller to transfer the data. The apparatus may further include an arbiter circuit configured to give priority for controlling the DMA controller to the isochronous engine. The apparatus may include the first device. The apparatus may be an endpoint device. The apparatus may be a host controller.

A system may include a first device, a second device, a non-transparent bridge, a processing element configured to implement an isochronous engine, and at least one DMA controller. The first and second devices and the bridge may be coupled via a memory-mapped fabric, and the first devices may reside in a first memory-mapped domain of the memory-mapped fabric while the second device may reside in a second memory-mapped domain of the memory-mapped fabric. The isochronous engine may be configured to control the at least one DMA controller for isochronous data transfer from the first device to the second device over the memory-mapped fabric via the non-transparent bridge.

Thus, embodiments of the present invention may allow for reliable, isochronous, configurable data transfer across different memory-mapped domains.

BRIEF DESCRIPTION OF THE DRAWINGS

A better understanding of the present invention can be obtained when the following detailed description of the preferred embodiment is considered in conjunction with the following drawings, in which.

Figure 1A:
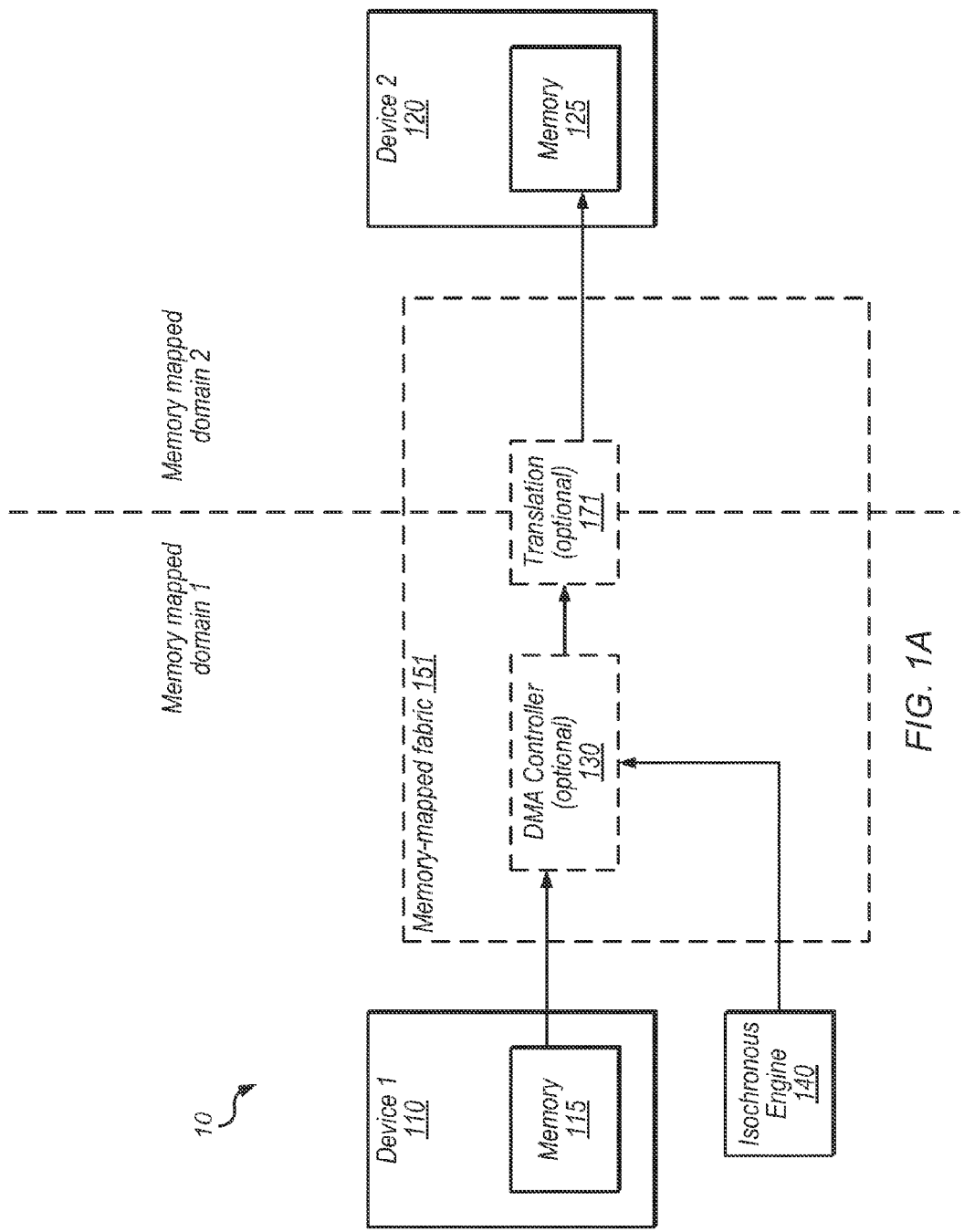
FIG. 1A is a block diagram illustrating one embodiment of an exemplary system for isochronous data transfer between different memory-mapped domains.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Pat. No. 7,210,117 titled "System and Method for Programmatically Generating a Graphical Program in Response to Program Information," filed Dec. 20, 2000.

U.S. patent application Ser. No. 13/606,293 titled "Clock Synchronization Over A Switched Fabric," filed Sep. 7, 2012.

U.S. patent application Ser. No. 13/606,514 titled "Switch for Clock Synchronization Over A Switched Fabric," filed Sep. 7, 2012.

TERMS

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Program—the term "program" is intended to have the full breadth of its ordinary meaning. The term "program" includes 1) a software program which may be stored in a memory and is executable by a processor or 2) a hardware configuration program useable for configuring a programmable hardware element.

Diagram—A graphical image displayed on a computer display which visually indicates relationships between graphical elements in the diagram. Diagrams may include configuration diagrams, system diagrams, physical diagrams, and/or graphical programs (among others). In some embodiments, diagrams may be executable to perform specified functionality, e.g., measurement or industrial operations, which is represented by the diagram. Executable diagrams may include graphical programs (described below) where icons connected by wires illustrate functionality of the graphical program. Alternatively, or additionally, the diagram may comprise a system diagram which may indicate functionality and/or connectivity implemented by one or more devices. Various graphical user interfaces (GUIs), e.g., front panels, may be associated with the diagram.

Graphical Program—A program comprising a plurality of interconnected nodes or icons, wherein the plurality of interconnected nodes or icons visually indicate functionality of the program. A graphical program is a type of diagram.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW, DasyLab, DiaDem and Matrixx/SystemBuild from National Instruments, Simulink from the MathWorks, VEE from Agilent, WiT from Coreco, Vision Program Manager from PPT Vision, SoftWIRE from Measurement Computing, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others.

The term "graphical program" includes models or block diagrams created in graphical modeling environments, wherein the model or block diagram comprises interconnected nodes or icons that visually indicate operation of the model or block diagram; exemplary graphical modeling environments include Simulink, SystemBuild, VisSim, Hypersignal Block Diagram, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes are often referred to as the block diagram portion of the graphical program.

Data Flow Graphical Program (or Data Flow Diagram)—A graphical program or diagram comprising a plurality of interconnected nodes, wherein the connections between the nodes indicate that data produced by one node is used by another node.

Physical Diagram—A diagram which visually indicates physical connectivity between physical devices. For example, a physical diagram may visually indicate the connectivity of various physical components in a measurement system, e.g., a computer connected to a measurement device via an Ethernet network. Thus the wires in a physical diagram represent physical connectivity between devices. A physical diagram may show the corresponding "real world" physical system/devices.

Configuration Diagram—A diagram which indicates connectivity between real and/or virtual devices. A configuration diagram may visually indicate physical connectivity between physical devices as shown in a physical diagram. However, in some embodiments, one or more of the devices (or all of the devices) in the configuration diagram may be virtual or simulated devices. Thus, some or all of the devices in the configuration diagram may not be physically present in the system represented by the configuration diagram.

System Diagram—A diagram with one or more device icons and graphical program code, wherein the device icons are use to specify and/or visually indicate where different portions of graphical program code are deployed/executed. A system diagram may indicate where (i.e., on which system/device) programs or code may be executed. For example, the system diagram may include graphical indications showing where portions of the displayed graphical program code are executed. In some embodiments, various ones of the icons may represent processing elements which have associated programs for execution. At least one of the icons may represent logical elements (e.g., executable software functions or graphical program code). One or more of the device icons may represent configurable elements. Thus, the system diagram may provide a system view which allows a user to easily understand where graphical program code is deployed among the various devices in the system.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements functionality of the node. Exemplary nodes (or blocks) include function nodes, sub-program nodes (sub-Vis), terminal nodes, structure nodes, etc. Nodes may be connected together in a graphical program by connection icons or wires. The term "logical element" is used herein to refer to a "node". For example, the term "logical element: may refer to a software program portion or code that is executable by (or implementable on) a processing element, and which is represented iconically on a display. Logical elements include virtual instruments (VIs), primitives, etc. Logical elements may be displayed in various ones of the diagrams described herein, e.g., in graphical programs, system diagrams, etc.

Wire—a graphical element displayed in a diagram on a display that connects icons or nodes in the diagram. The diagram may be a graphical program (where the icons correspond to software functions), a system diagram (where the icons may correspond to hardware devices or software functions), etc. The wire is generally used to indicate, specify, or implement communication between the icons, or that express or specify a connection or relationship between the icons (or entities represented by the icons). Wires may represent logical data transfer between icons, or may represent a physical communication medium, such as Ethernet, USB, etc. Wires may implement and operate under various protocols, including data flow semantics, non-data flow semantics, etc. Some wires, e.g., buffered data transfer wires, may be configurable to implement or follow specified protocols or semantics. Wires may indicate communication of data, timing information, status information, control information, and/or other information between icons. In some embodiments, wires may have different visual appearances which may indicate different characteristics of the wire (e.g., type of data exchange semantics, data transport protocols, data transport mediums, and/or type of information passed between the icons, among others).

Data Flow Wire—a graphical element displayed in a diagram on a display that connects icons or nodes in the diagram and denoting that data are exchanged between the two icons or nodes.

Isochronous Data Flow Wire—a graphical element displayed in a diagram on a display that connects icons or nodes in the diagram, which denotes that data are exchanged between the two entities and that further denotes and constrains the exchange of data to occur periodically, at a fixed rate that remains constant over time. The data exchange path or transmission media (e.g., PCI bus) may be managed such that it is available to exchange the data at the appointed time, thus guaranteeing bandwidth for the transfer, and providing an upper bound for the data's arrival time (transfer latency).

Clock Disciplining Wire—a graphical element displayed in a diagram on a display that connects two clocks in a clock hierarchy, and that establishes a master/slave relationship between the two clocks.

Timed Invocation Wire—a graphical element displayed in a diagram on a display that connects two nodes or icons, where a first node or icon invokes (causes execution of) a second node or icon connected by the timed invocation wire to the first node or icon. The first node or icon determines the execution rate of the second node or icon by communicating the execution rate to the second node or icon via the timed invocation wire, or, alternatively, by sending invocation commands (or events) to the second node or icon via the timed invocation wire or by some other mechanism.

Timing Wire—a graphical element displayed in a diagram on a display that connects two entities (e.g., nodes or icons), and that implies a timing relationship between them. The timing relationship may be any of a master/slave clock disciplining relationship or an invocation timing relationship.

Invocation Timing Relationship—a relationship in which a first node or icon is connected to a second node or icon by a timed invocation wire where the execution rate of the second node or icon is controlled by the first node or icon.

Execution Rate—the number of invocations per unit time of an entity.

Execution Offset—a delay in the execution of one node or icon with respect to execution of another node or icon, where, e.g., a first node or icon is connected to a second node or icon by a timed invocation wire where the execution rate of the second node or icon is controlled by the first node or icon. The moment of execution of the second node or icon may be configured to be delayed (or offset) from the time strictly determined by the first node or icon.

Timing Generator—a node on a graphical diagram that is the source of timed invocation wires.

Timing Diagram—a graphical diagram depicting the master/slave relationships and invocation timing relationships of all the entities (e.g., nodes or icons) in a system.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a diagram, e.g., a graphical program. In this instance, various mechanisms may be used to connect GUI Elements in the GUI with nodes or icons in the diagram/graphical program. For example, when Input Controls and Output Indicators are created in the GUI, corresponding nodes (e.g., terminals) may be automatically created in the diagram or graphical program. Alternatively, the user can place terminal nodes in the diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program or diagram, and view output of the program or diagram, during execution.

A front panel is a type of GUI. A front panel may be associated with a diagram or graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators Input Control—a graphical user interface element for providing user input to a program. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Processing Element—Various elements or combinations of elements. Processing elements include, for example, circuits, portions or circuits of individual processor cores, entire processor cores, programmable hardware devices, individual processors, and/or larger portions of systems that include multiple processors.

Configurable Elements—Systems or devices that provide configurable functionality but do not themselves includes processors that process data. Configurable elements may produce and/or consume data that may be provided to or received from various processing elements. A configurable element may have or receive configuration data that specifies functionality of the configurable element. Configurable elements comprise data acquisition (DAQ) devices and/or other sensors/devices.

Clock—a periodic signal, e.g., as in a two valued (binary) electrical signal; an entity that can be queried for a time stamp.

Time stamp—a data representation of time; an indication of when a record was generated or acquired, e.g., in terms of a tick count of a clock, a single unit of time, e.g., seconds, a multi-unit instant in time, e.g., year:month:day:hours:minutes:seconds:sub-seconds.

Clock Hierarchy—a collection of two or more clocks that share in a synchronization scheme such that all the clocks in the hierarchy agree on the time, where one clock operates as master clock and the others operate as slaves. The synchronization scheme may insure that all the periodic binary electrical signals in the hierarchy have a fixed phase relationship, and that all clocks return equal valued time stamps when queried at the same instant.

Phase Relationship—the relative time between like changes in value of two or more binary electrical signals. The phase relationship is 'fixed' when the relative time of these like value changes between the signals is constant over the life of the signals.

Clock Symbol—a node on a graphical diagram that represents a clock.

Master Clock—a first clock in a clock hierarchy with which the remaining clocks in the hierarchy must agree.

Slave Clock—a second clock in a clock hierarchy whose timing is forced to agree with a first clock in the clock hierarchy where the first clock is called the master clock.

Master/Slave Relationship—a first clock in a clock hierarchy forces a second clock in the clock hierarchy to agree with the first clock, including maintaining a fixed phase relationship between first and second binary valued electrical signals, and time stamp equivalency for simultaneous first and second clock time stamp queries. The first clock is the master in this relationship between the two clocks, and the second clock is the slave in this relationship.

Switched Fabric—a network or bus topology wherein nodes are interconnected via one or more switches. A switch may route communications received at a switch port to one or more other switch ports. For example, a PCIe switched fabric allows devices to communicate via one or more PCIe switches.

As used herein, the terms "first," "second," "third," etc. do not necessarily imply an ordering (e.g., temporal) between elements. For example, a reference to a "first" cycle of an isochronous period and a "second" cycle of an isochronous period refer to any two cycles of the period, not necessarily an initial cycle and a cycle that follows the initial cycle according to some ordering.

Embodiments of a system, apparatus, and method for isochronous data transfer between different memory-mapped domains in a distributed system are described below.

Isochronous Transfer Introduction

Referring now to FIG. 1, a system 10 for isochronous data transfer between memory-mapped domains is shown. System 10 includes device 1 110, device 2 120, DMA controller 130 (optional), and isochronous engine 140. Device 1 and device 2 are coupled via memory-mapped fabric 151. In the illustrated embodiment, device 1 resides in memory-mapped domain 1 while device 2 resides in memory-mapped domain 2. Device 1 includes memory 115 and device 2 includes memory 125. Isochronous engine 140 may be configured to transfer data in an isochronous manner between memory-mapped domain 1 and memory-mapped domain 2, e.g., from memory 115 to memory 125.

Transfers between memory-mapped domain 1 and memory-mapped domain 2 may involve address translation, represented in FIG. 1 as translation 171. For example, in one embodiment in which memory-mapped domain 1 and memory-mapped domain 2 are separated by a non-transparent bridge (NTB), the NTB may include hardware for translating addresses. In some embodiments, device 1, device 2, and isochronous engine 140 may be associated with respective logical clocks. The respective logical clocks may be synchronized to a global time (i.e., master time). This synchronization may allow for reliable isochronous data transfer between different clock domains (which may correspond, in some embodiments, to different memory-mapped domains).

Note that as used herein the term "logical clock" refers to a software or hardware implementation of a clock that is derived from a physical clock, e.g., a local physical clock on a device, and which can be synchronized with or "disciplined" to a reference or global clock.

Further, as used herein, the term "memory-mapped domain" refers to one or more devices coupled via a memory-mapped fabric and directly assigned address windows in a memory map by the same host controller. The host controller may assign one or more address windows to itself.

The term "directly assigned" refers to a situation in which the host controller assigns address windows, i.e., respective address ranges, to devices in the memory mapped domain during the host controller's initialization of the memory mapped fabric. After this assignment, a device assigned to a corresponding address window receives and handles packets destined to its assigned address range. In contrast, for an address window that is not "directly assigned" by a given host (i.e., an address window of a device in a different memory-mapped domain), translation of packet addresses to a different host controller's assigned address window may be required for the given host controller to communicate with the device assigned to the address window.

For example, enumeration by a PCIe host controller may include assigning address windows to various devices within the memory-mapped domain of the PCIe host controller. In a PCIe system, NTB's separate different memory-mapped domains. A host controller in a first memory-mapped domain may assign an NTB one or more address windows which the NTB and software running on the first host controller may associate with devices or memory in a second memory-mapped domain (and/or additional memory-mapped domains). Thus, the devices in the second memory-mapped domain are not "directly assigned" address windows by the host controller and thus do not reside in the first memory-mapped domain. Such an NTB may be configured to handle packets from devices in the first memory-mapped domain that fall within certain address windows, translate addresses of the packets, and forward the packets to devices in the second memory-mapped domain. An NTB may be similarly configured to translate and/or forward packets in the other direction, i.e., from the second memory-mapped domain to the first memory-mapped domain. In the PCIe context, a single host controller may reside in each memory-mapped domain.

As used herein, the term "host controller" refers to a processing element that assigns address windows to devices within one or more memory-mapped domains (i.e., maintains a memory map). A host controller may be an intelligent (processor based) device. For example, in the PCIe context, a host controller may include a processor and a PCIe root complex. Further, as used herein, the term "endpoint device" refers to a processing element that is coupled to a host controller via a memory-mapped fabric. For example, in the PCIe context, an endpoint device may be directly coupled to a PCIe root complex, or indirectly coupled to the root complex through one or more PCIe switches. Host controllers and/or endpoints may communicate with other host controllers and/or endpoints in different PCIe memory-mapped domains via non-transparent bridges (NTB's).

Still further, as used herein, the term "based on" is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

Still further, the term "configured to" is used herein to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component.

Because different memory-mapped domains include different controllers, different memory-mapped domains typically correspond to different clock domains. However, as used herein, the term "memory-mapped domain" is not intended to imply different clock domains: different memory-mapped domains may or may not correspond to different clock domains. Accordingly, in some embodiments, different memory-mapped domains correspond to different clock domains, and devices in different memory-mapped domains synchronize their respective clocks to a reference clock.

In various embodiments, isochronous engine 140 may be implemented by device 1, device 2, another device in one of the memory-mapped domains, a bridge device, or may be implemented by a stand-alone processing element as illustrated. Isochronous engine 140 may be implemented by a processor, microcontroller, a programmable hardware element (e.g., a field-programmable gate array), and/or a circuit, in various embodiments.

In one embodiment, isochronous engine 140 is configured with one or more isochronous periods for isochronous (e.g., repeated, time-based) data transfer. In one embodiment, isochronous engine 140 is configured to initiate a transfer of data from memory 115 to memory 125 at a specified point within a cycle of an isochronous period. For example, isochronous engine 140 may transfer data by controlling DMA controller 130 to transfer data from memory 115 to memory 125 during a specified portion of the cycle. One or more addresses related to the transfer may be translated because the data are transferred between different memory-mapped domains. In the illustrated embodiment, isochronous engine 140 is configured to repeatedly transfer successive data in an iterative manner over the memory-mapped fabric during the specified portion of successive cycles of the isochronous period.

Figure 1B:
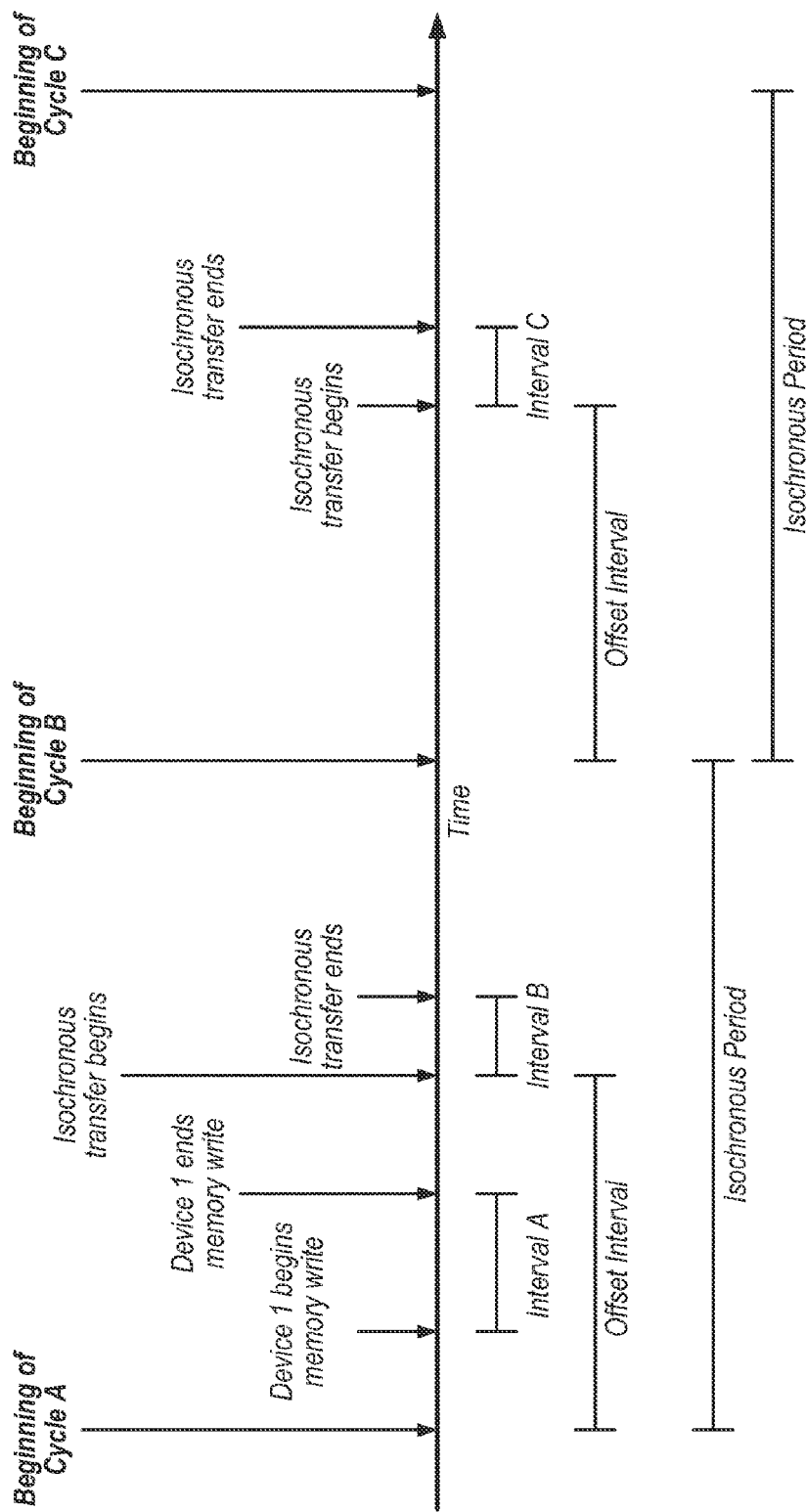
FIG. 1B is a time diagram illustrating exemplary cycles of an isochronous period.

Referring now to FIG. 1B, a timing diagram illustrating exemplary cycles of an isochronous period according to one embodiment is shown. As shown in FIG. 1B, an "isochronous period" refers to the length of time between beginnings of cycles of the isochronous period. The isochronous period may be associated with a corresponding "isochronous frequency" (i.e. 1/period). Therefore, setting or configuring an isochronous period may include setting or configuring an isochronous frequency, and vice versa.

In the illustrated embodiment, during interval A within cycle A, device 1 writes to memory 115 (i.e., writes to memory 115 during a specified portion of cycle A). In various embodiments, intervals or portions of a cycle of various durations may be defined during which a device may be configured to write to a memory. A portion of memory 115 may thus be reserved as an "isochronous buffer" for transferring data from device 1 to another device in an isochronous manner.

As FIG. 1B also shows, at the beginning of interval B, isochronous engine 140 initiates a transfer of data between memory 115 and memory 125. The transfer continues until the end of interval B (i.e. during a specified portion of cycle A). In some embodiments, the specified portion is specified as or via an offset from the beginning of each cycle (e.g., the "offset interval" of FIG. 1B), e.g., where the specified portion begins at the offset. A portion of memory in memory 125 may be reserved as an isochronous buffer for receiving data in an isochronous manner. Device 2 may read (not shown) from the isochronous buffer of memory 125 in order to retrieve transferred data. For example, device 2 may read from memory 125 during interval A of cycle A to retrieve data written to memory 125 during a previous cycle of the isochronous period (i.e., a cycle occurring before cycle A). In various embodiments, specified first and second intervals during which device 1 may write to an isochronous buffer in memory 115 and device 2 may read from an isochronous buffer in memory 125 may be the same interval, may overlap, or may be separate, non-overlapping intervals. In some embodiments, the specified first and second intervals do not overlap the specified interval during which isochronous data transfer occurs.

The isochronous buffer in memory 115 may be associated with a different address than the isochronous buffer in memory 125. Further, because memory 115 and memory 125 reside in different memory-mapped domains, translation of destination addresses of packets involved in the transfer may allow correct delivery of such packets. In other words, an address or address window of the isochronous buffer in memory 125 may be different in memory-mapped domain 1 than in memory-mapped domain 2.

In the illustrated embodiment, at the beginning of interval C within cycle B, isochronous engine 140 initiates another transfer of data between memory 115 and memory 125. The transfer continues until the end of interval B. In the illustrated diagram, the data transferred during interval B and the data transferred during interval C may be the same data, because device 1 did not write to memory 115 during any portion of interval C. In other cycles, device 1 may write different data to memory 115 during a portion of a cycle of the isochronous period similarly to the data writing during interval A of cycle A.

In some embodiments, isochronous engine 140 is configured with various parameters such as, for example, an isochronous period (or frequency), an offset within each cycle at which to initiate isochronous transfers, a starting point in time of an initial cycle of the isochronous period, and so on.

Isochronous engine 140 may be configured to specify multiple isochronous intervals and to control DMA controller 130 to transfer data based on those intervals. Isochronous engine 140 may control isochronous transfers between multiple devices residing in multiple different memory-mapped domains without requiring the devices to initiate each transfer. Isochronous data transfer by isochronous engine 140 may be more precise and reliable than isochronous data transfer by a host device.

As mentioned above with reference to FIG. 1A, device 1, device 2, and isochronous engine 140 may be synchronized to a global or master time (e.g., to a master clock). Synchronization of these elements may be important for reliable isochronous data transfer. For example, if device 1 and isochronous engine 140 are not synchronized to a master time, device 1 may not end its memory write in cycle A before isochronous engine 140 begins the isochronous transfer (i.e., interval A and interval B may overlap). In such a situation, data may be lost, e.g., because isochronous engine 140 transfers old data before device 1 writes new data to an isochronous buffer. Similarly, synchronization of device 2 with isochronous engine 140 may allow device 2 to read from an isochronous buffer during different intervals than those in which isochronous engine 140 writes to the buffer. Thus, synchronization of various elements may allow for reliable isochronous data transfer between different memory-mapped domains.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications include hardware-in-the-loop testing and rapid control prototyping, among others.

However, it is noted that embodiments of the present invention can be used for a plethora of applications and is not limited to the above applications. In other words, applications discussed in the present description are exemplary only, and embodiments of the present invention may be used in any of various types of systems. Thus, embodiments of the system and method of the present invention is configured to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Additionally, the techniques disclosed herein may be further applicable in other domains, such as, for example, audio/video applications, timed data acquisition, radio frequency applications, etc., among others.

Figure 2A:
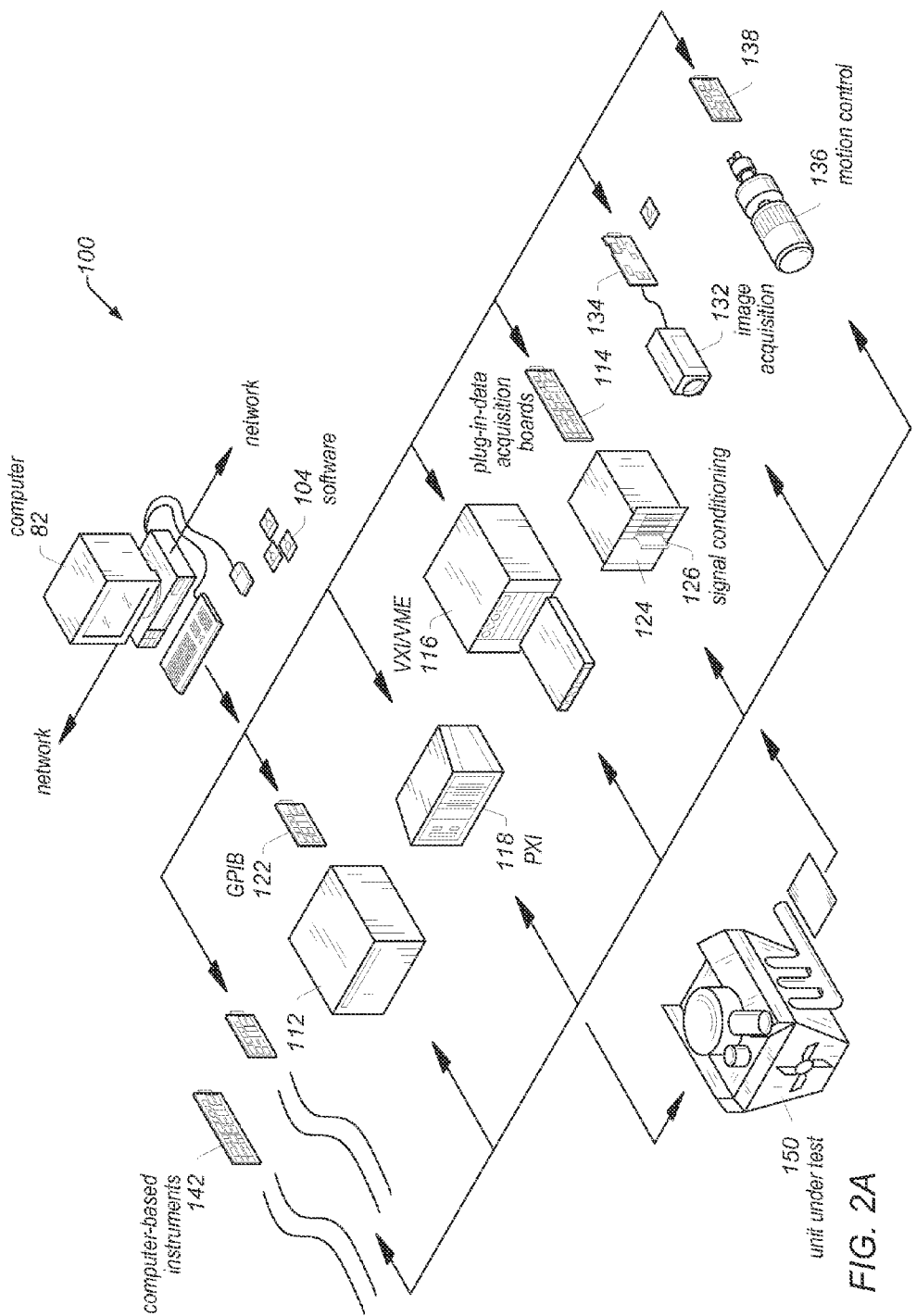
FIG. 2A illustrates an instrumentation control system according to one embodiment of the invention.

FIG. 2A illustrates an exemplary instrumentation control system 100 which may implement embodiments of the invention. The system 100 comprises a host computer 82 which couples to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150.

Figure 4:
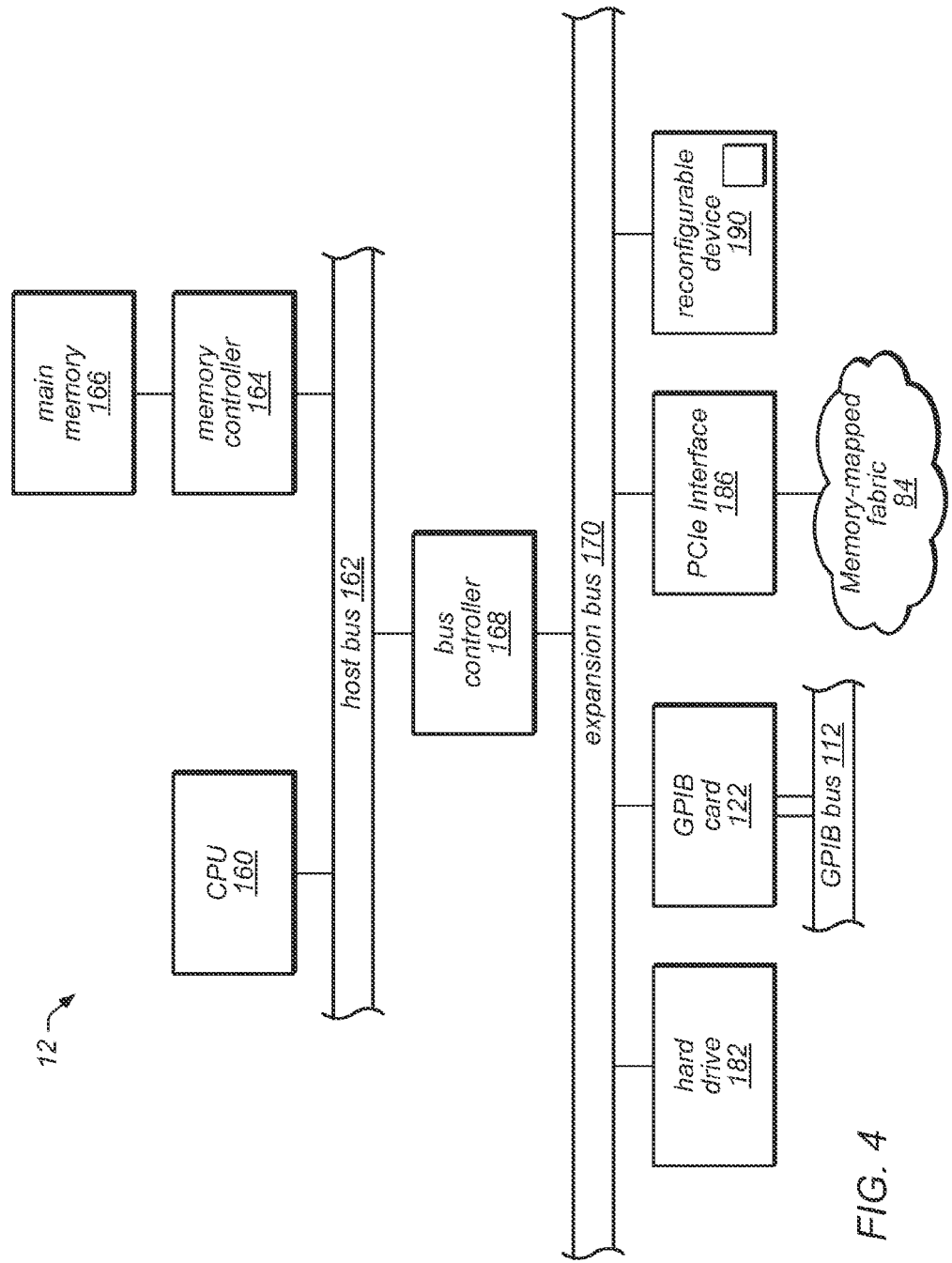
FIG. 4 is an exemplary block diagram of the computer systems of FIGS. 2A, 2B, and 3B.

The one or more instruments may include a GPIB instrument 112 and associated GPIB interface card 122, a data acquisition board 114 inserted into or otherwise coupled with chassis 124 with associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. In one embodiment, the computer 82 may couple to a switched fabric, e.g., a PCIe (Peripheral Component Interconnect (PCI) Express) based memory-mapped fabric, e.g., via a PCIe interface, as indicated in FIG. 4, and may couple to one or more instruments or other devices with respective (and different) clock domains, as discussed in more detail below.

The computer system may couple to and operate with one or more of these instruments. The instruments may be coupled to the unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 2B:
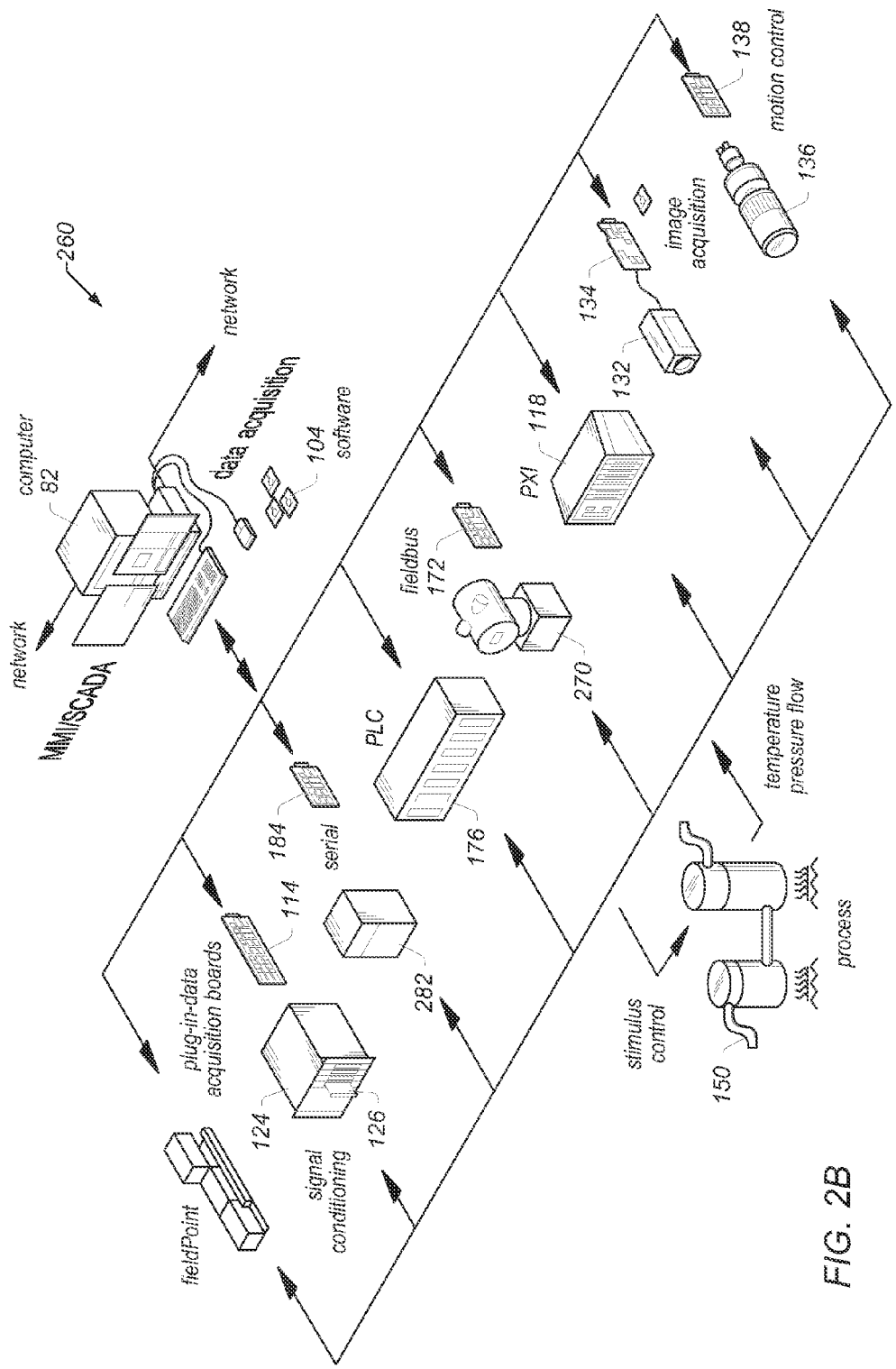
FIG. 2B illustrates an industrial automation system according to one embodiment of the invention.

FIG. 2B illustrates an exemplary industrial automation system 260 which may implement embodiments of the invention. The industrial automation system 160 is similar to the instrumentation or test and measurement system 100 shown in FIG. 2A. Elements which are similar or identical to elements in FIG. 2A have the same reference numerals for convenience. The system 260 may comprise a computer 82 which couples to one or more devices or instruments, possibly via a switched fabric, e.g., In one embodiment, the computer 82 may couple to a switched fabric, e.g., a PCIe based switched fabric, e.g., via a PCIe interface, as indicated in FIG. 4, and may couple to one or more instruments or other devices with respective (and different) clock domains. The computer 82 may comprise a CPU, a display screen, memory, and one or more input devices such as a mouse or keyboard as shown. The computer 82 may operate with the one or more devices to perform an automation function with respect to a process or device 150, such as MMI (Man Machine Interface), SCADA (Supervisory Control and Data Acquisition), portable or distributed data acquisition, process control, advanced analysis, or other control, among others.

The one or more devices may include a data acquisition board 114 inserted into or otherwise coupled with chassis 124 with associated signal conditioning circuitry 126, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 282 and associated serial interface card 184, or a distributed data acquisition system, such as the Fieldpoint system available from National Instruments, among other types of devices.

Figure 3A:
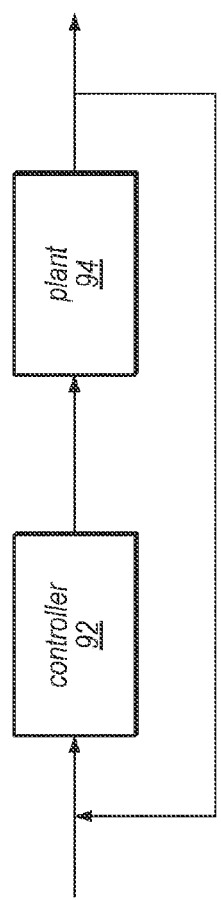
FIG. 3A is a high level block diagram of an exemplary system which may execute or utilize embodiments of the invention.

FIG. 3A is a high level block diagram of an exemplary system which may execute or utilize programs according to some embodiments. FIG. 3A illustrates a general high-level block diagram of a generic control and/or simulation system which comprises a controller 92 and a plant 94. The controller 92 represents a control system/algorithm the user may be trying to develop. The plant 94 represents the system the user may be trying to control. For example, if the user is designing an ECU for a car, the controller 92 is the ECU and the plant 94 is the car's engine (and possibly other components such as transmission, brakes, and so on.) As shown, a user may create a program, e.g., a graphical program, which specifies or implements the functionality of one or both of the controller 92 and the plant 94. For example, a control engineer may use a modeling and simulation tool to create a model (e.g., program) of the plant 94 and/or to create the algorithm (program) for the controller 92. Embodiments of the techniques disclosed herein may be used to transfer data between components of such a system.

Figure 3B:
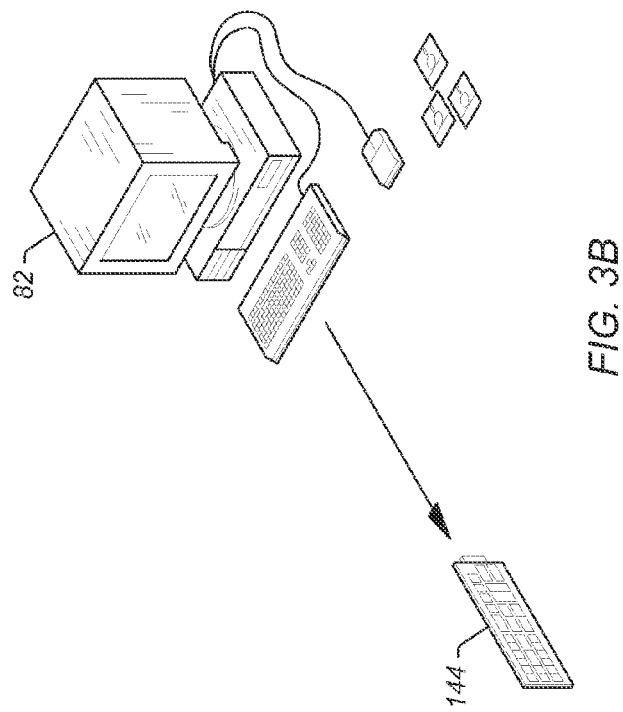
FIG. 3B illustrates an exemplary system which may perform control and/or simulation functions utilizing embodiments of the invention.

FIG. 3B illustrates an exemplary system which may perform control and/or simulation functions. As shown, the controller 92 may be implemented by a computer system 82 or other device (e.g., including a processor and memory medium and/or including a programmable hardware element) that executes or implements a program. In a similar manner, the plant 94 may be implemented by a computer system or other device 144 (e.g., including a processor and memory medium and/or including a programmable hardware element) that executes or implements a program, or may be implemented in or as a real physical system, e.g., a car engine.

In one embodiment of the invention, one or more programs may be created which are used in performing rapid control prototyping. Rapid Control Prototyping (RCP) generally refers to the process by which a user develops a control algorithm and quickly executes that algorithm on a target controller connected to a real system. The user may develop the control algorithm using a program, e.g., a graphical program, and the program may execute on the controller 92, e.g., on a computer system or other device. The computer system 82 may be a platform that supports real time execution, e.g., a device including a processor that executes a real time operating system (RTOS), or a device including a programmable hardware element.

In one embodiment of the invention, one or more programs may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a program) is executed in real time to make the real controller 92 "believe" or operate as if it is connected to a real plant, e.g., a real engine.

In the embodiments of FIGS. 2A, 2B, and 3B above, one or more of the various devices may couple to each other over a network, such as the Internet. In one embodiment, the user operates to select a target device from a plurality of possible target devices for programming or configuration using a program. Thus the user may create a program on a computer and use (execute) the program on that computer or deploy the program to a target device (for remote execution on the target device) that is remotely located from the computer and coupled to the computer through a network. As noted above, in some embodiments, the program or programs implementing or implemented by the present invention may be graphical programs.

Graphical software programs which perform data acquisition, analysis and/or presentation, e.g., for measurement, instrumentation control, industrial automation, modeling, or simulation, such as in the applications shown in FIGS. 2A and 2B, may be referred to as virtual instruments.

FIG. 4—Computer System Block Diagram

FIG. 4 is a block diagram representing one embodiment of a computer system or controller, as shown in FIG. 1, 2A, or 2B. It is noted that any type of computer system configuration or architecture can be used as desired, and FIG. 4 illustrates a representative PC embodiment. It is also noted that the computer system may be a general purpose computer system, a computer implemented on a card installed in a chassis, a controller, e.g., an embedded controller, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store the program(s) configured to implement embodiments of the invention. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170. The computer 82 may also comprise a GPIB card 122 coupled to a GPIB bus 112, and/or a PCIe (Peripheral Component Interconnect (PCI) Express) interface 186 for coupling to a memory-mapped fabric 84, e.g., a PCIe based switched fabric, although other switched fabrics and interfaces may be used as desired.

As shown, a device (or multiple devices, e.g., controllers) 190 may also be connected to the computer. The device 190 may include a processor and memory which may execute a real time operating system. The device 190 may also or instead comprise a programmable hardware element. The computer system may be configured to deploy a program to the device 190 for execution. The deployed program may take the form of graphical program instructions or data structures that directly represents the graphical program. Alternatively, the deployed program may take the form of text code (e.g., C code), which may be written, or generated from a graphical program. As another example, the deployed program may take the form of compiled code generated from either the graphical program or from text code, which may itself have been generated from the graphical program.

Isochronous Data Transfer

Figure 5:
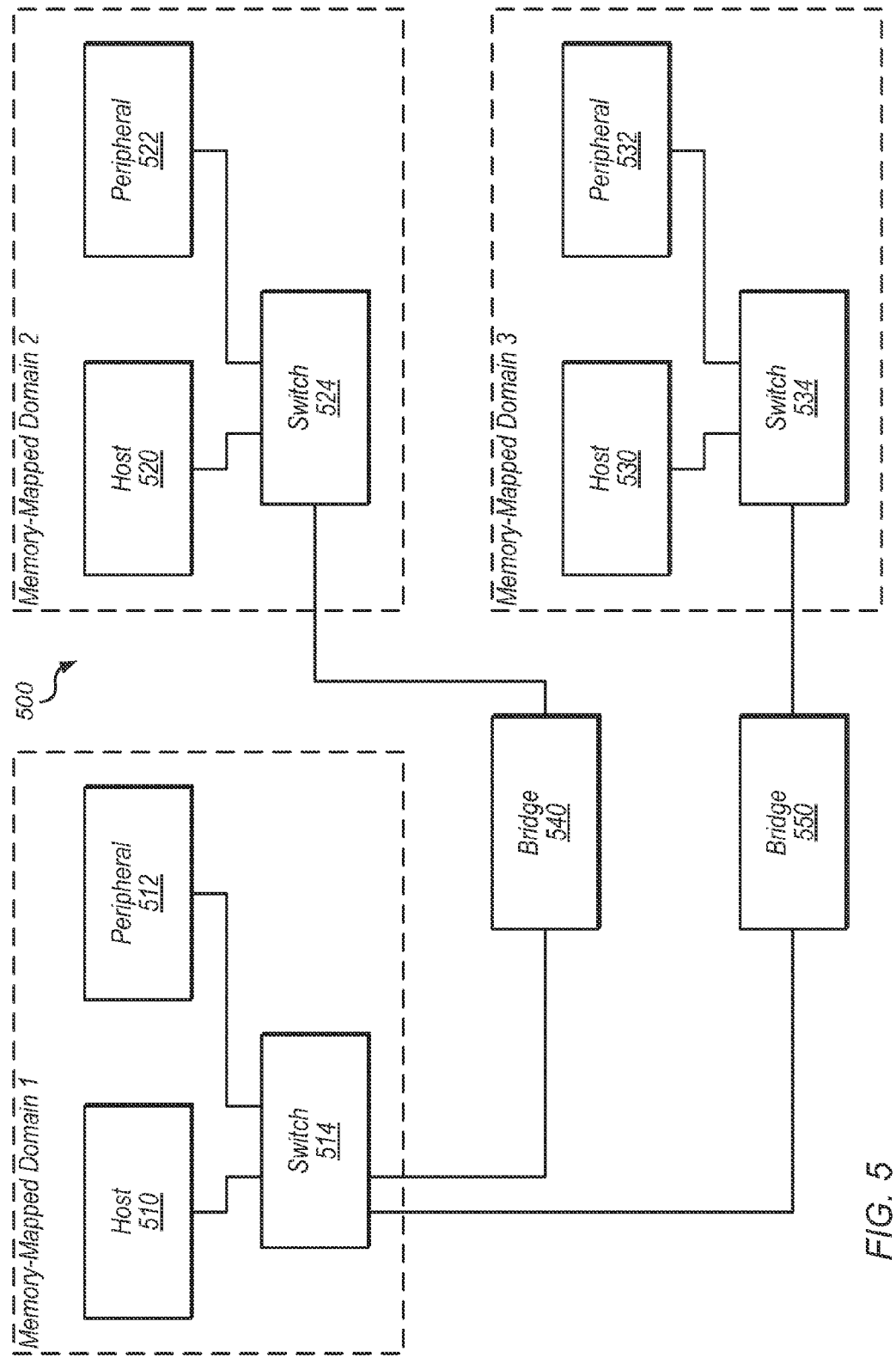
FIG. 5 is a block diagram illustrating one embodiment of an exemplary system that includes multiple memory-mapped domains.

Referring now to FIG. 5, an exemplary system 500 that includes multiple memory-mapped domains is shown. Domain 1 includes host 510, peripheral 512 and switch 514. Domain 2 includes host 520, peripheral 522, and switch 524. Domain 3 includes host 530, peripheral 532, and switch 534. In the illustrated embodiment, bridge 540 connects domain 1 and domain 2 and bridge 550 connects domain 1 and domain 3. The elements of FIG. 5 are coupled via a memory-mapped fabric.

As used herein, the term "coupled to" may indicate one or more connections between elements, and a coupling may include intervening elements. For example, in FIG. 1, host 510 may be described as "coupled to" host 530 via switch 514, bridge 550, and switch 534. In contrast, in the illustrated embodiment of FIG. 1, host 510 is "directly coupled" to switch 514 because there are no intervening elements.

In one embodiment, the memory-mapped fabric is a PCIe fabric. In this embodiment, host 510 is a host controller, peripheral 512 is PCIe peripheral device and switch 514 is a PCIe switch. In this embodiment, peripheral 512 may be a PCIe endpoint device. In this embodiment, bridges 540 and 550 are non-transparent bridges.

Bridges 540 and 550 may translate addresses associated with packets or data transferred between different memory-mapped domains. The placement of bridges 540 and 550 in the illustrated embodiment is in no way intended to limit the location of bridge 540 and/or bridge 550 in other embodiments. For example, in one embodiment, bridge 540 and bridge 550 are included memory-mapped domain 1, e.g., in switch 514. In this embodiment, system 500 may be described as a single-NTB bridged system. In another embodiment, bridge 540 is included in memory-mapped domain 2 (e.g., in switch 524) and bridge 550 is included in memory-mapped domain 3 (e.g., in switch 534). In this embodiment, system 500 may be described as a multiple-NTB bridge system. In various embodiments, one or more isochronous engines may be configured to control isochronous transfer of data between various devices in different memory-mapped domains.

For example, in one embodiment, at least one isochronous engine corresponding to each memory-mapped domain is configured to control isochronous transfer of data from devices of that domain to devices of other domains. In this embodiment, memory-mapped domain 1 includes at least one isochronous engine (which may reside in host 510, peripheral 512, switch 514, bridge 540, or bridge 550, for example), configured to control isochronous transfer of data from host 510 and/or peripheral 512 to devices in memory-mapped domain 2 and/or memory-mapped domain 3. Similarly, in this embodiment, memory-mapped domain 2 includes at least one isochronous engine configured to control isochronous transfer of data from host 520 and/or peripheral 522 to devices in memory-mapped domain 1 and/or memory-mapped domain 3. In another embodiment, each device from which data are transferred may include an isochronous engine.

In yet another embodiment, an isochronous engine may control isochronous data transfers both into a memory-mapped domain and out of the memory-mapped domain. However, in this embodiment, a processing element configured to configure the isochronous engine with information corresponding to isochronous data transfer may need further information about translations between the memory-mapped domains before configuring the isochronous engine. For example, consider a situation in which a processing element residing in memory-mapped domain 2 configures an isochronous engine associated with memory-mapped domain 1 to transfer data from memory-mapped domain 1. In this exemplary situation, the processing element may require a translation of a source address of the data as well as translation of a destination address before configuring the isochronous engine to perform the isochronous transfer. Therefore, embodiments in which an isochronous engine controls isochronous data transfers to other memory-mapped domains but not from other memory-mapped domains (other than a memory-mapped domain associated with the isochronous engine) may simplify configuration of the isochronous engine.

Similarly, various embodiments may include various numbers of DMA controllers. In one embodiment, a single DMA controller may be used for all DMA data transfers in a system. In another embodiment, a DMA controller may be included in each memory-mapped domain. For example, in a two-domain memory-mapped system that includes two isochronous engines (e.g., one isochronous engine corresponding to each domain), the system may include a single DMA controller for transferring data between the two memory-mapped domains. Alternatively such a system may include two or more DMA controllers, e.g., at least one DMA controller corresponding to each domain. In one embodiment, a DMA controller may be configured to implement an isochronous engine. An isochronous engine may control a DMA controller by writing parameters for a transfer to configuration register of a DMA controller, for example.

Figure 6:
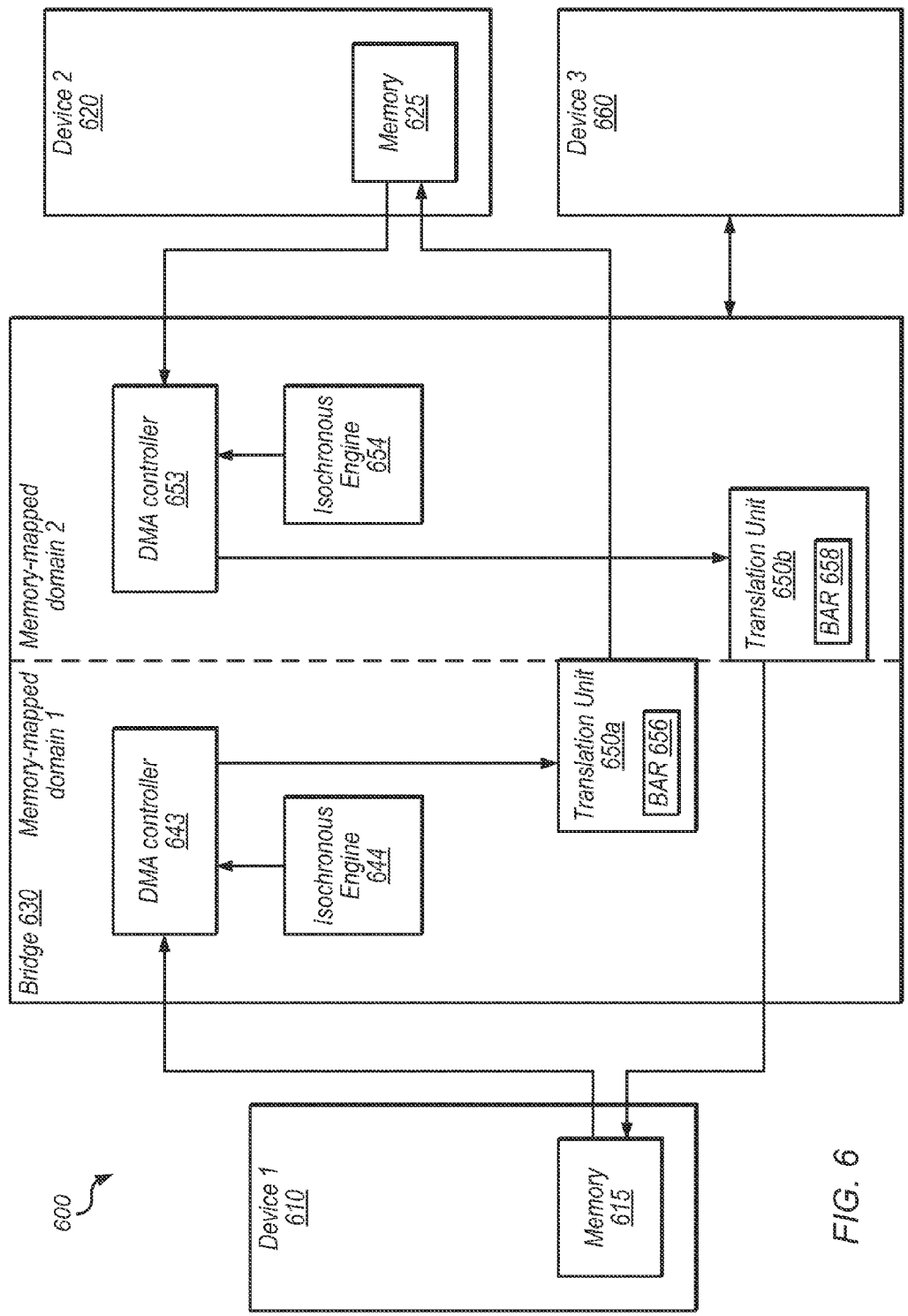
FIG. 6 is a block diagram illustrating one embodiment of an exemplary bridge in a bridged system.

Referring now to FIG. 6, a block diagram illustrating one embodiment of a bridge 630 in a system 600 is shown. In the illustrated embodiment, bridge 630 is a non-transparent bridge (NTB). A NTB functions as a gateway between processors. It isolates intelligent (processor based) subsystems from each other by masquerading as endpoints to discovery software and translating the addresses of transactions that cross the bridge. It hides the devices connected to each intelligent system from each other. Thus, devices connected via a memory-mapped fabric but separated by a NTB reside in different "memory-mapped domains." The vertical dashed line of bridge 630 indicates separation between different memory-mapped domains (memory-mapped domain 1 and memory-mapped domain 2).

Bridge 630 is coupled to device 1 610, device 2 620, and device 3 660 via a memory-mapped fabric, e.g., a PCIe fabric. Bridge 630 includes DMA controllers 643 and 653, isochronous engines 644 and 654, and translation units 650a and 650b. Isochronous engines 644 and 654 may be configured to control DMA controllers 643 and 653 to transfer data between memory 615 of device 1 and memory 625 or device 2 during specified portions of one or more isochronous periods. Translation units 650a and 650b may be configured to translate one or more addresses related to such transfers.

For example, in the illustrated embodiment, isochronous engine 644 is configured to control DMA controller 643 to transfer data in an isochronous manner during specified portions of successive cycles of one or more isochronous periods from memory 615 to memory 625 through translation unit 650a. Similarly, in the illustrated embodiment, isochronous engine 654 is configured to control DMA controller 653 to transfer data in an isochronous manner during specified portions of successive cycles of one or more isochronous periods from memory 625 to memory 615 through translation unit 650b.

DMA controllers 643 and 653 are illustrated as separate elements for illustrative purposes, but in one embodiment, a single DMA controller transfers data between memory 615 and memory 625 (i.e., in both directions), e.g., under control of the isochronous engine(s).

Isochronous engines 644 and 654 are separate elements in the illustrated embodiment in order to facilitate configuration of isochronous engines 644 and 654. For example, because isochronous engine 644 resides in memory-mapped domain 1, devices in memory-mapped domain 1 can configure isochronous engine 644 without crossing a NTB (crossing a NTB may complicate configuration of an isochronous engine because of address translation, etc.). Similarly, devices in memory-mapped domain 2 (e.g., device 2 and device 3) can configure isochronous engine 654 without crossing a NTB. However, in other embodiments, a single isochronous engine may be used to control data transfers between memory 615 and memory 625 (i.e., in both directions). Such a single isochronous engine may be configured by devices from only one memory-mapped domain, or by devices in multiple memory-mapped domains. In embodiments where isochronous engines 644 and 645 are separate entities, they may be implemented by a single processing element or multiple processing elements.

Translation units 650*a* and 650*b* are shown separately for illustration purposes in FIG. 6, but may be comprised in a single translation processing element in some embodiments. Translation units 650*a* and 650*b* each include a base address register (BAR) in the illustrated embodiment. In various embodiments, a translation unit may include any number of BARs as appropriate.

In the illustrated embodiment, translation unit 650*a* includes base address BAR 656. In one embodiment in which the memory-mapped fabric is a PCIe fabric, BAR 656 specifies an address window. In this embodiment, when a packet falling within the address window is detected (e.g., a packet from DMA controller 643 or device 1), BAR 656 replaces a base address in a field of the packet with a translated base address corresponding to a base address of memory-mapped domain 2 and forwards the packet to memory-mapped domain 2. Based on the translation, device 2 may detect that the translated address of the packet falls within an address window corresponding to device 2 and may appropriately handle the packet. In other embodiments, other methodologies may be used to translate addresses between different memory-mapped domains, which may or may not include utilizing a BAR.

In one embodiment, device 1 is a host device. In another embodiment, device 1 is an endpoint device or peripheral device. In one embodiment, device 1 configures isochronous engine 644 with information corresponding to isochronous data transfer. This information may include, e.g., one or more isochronous periods, one or more specified offsets or portions within cycles of isochronous periods, source and destination addresses, sizes or amounts of data, and so on. In another embodiment, another device within memory-mapped domain 1 may configure isochronous engine 644 with similar information. In other words, a device may configure an isochronous engine for isochronous data transfer from and/or to another device. For example, device 3 may configure isochronous engine 654 for isochronous data transfer from device 2.

Figure 7:
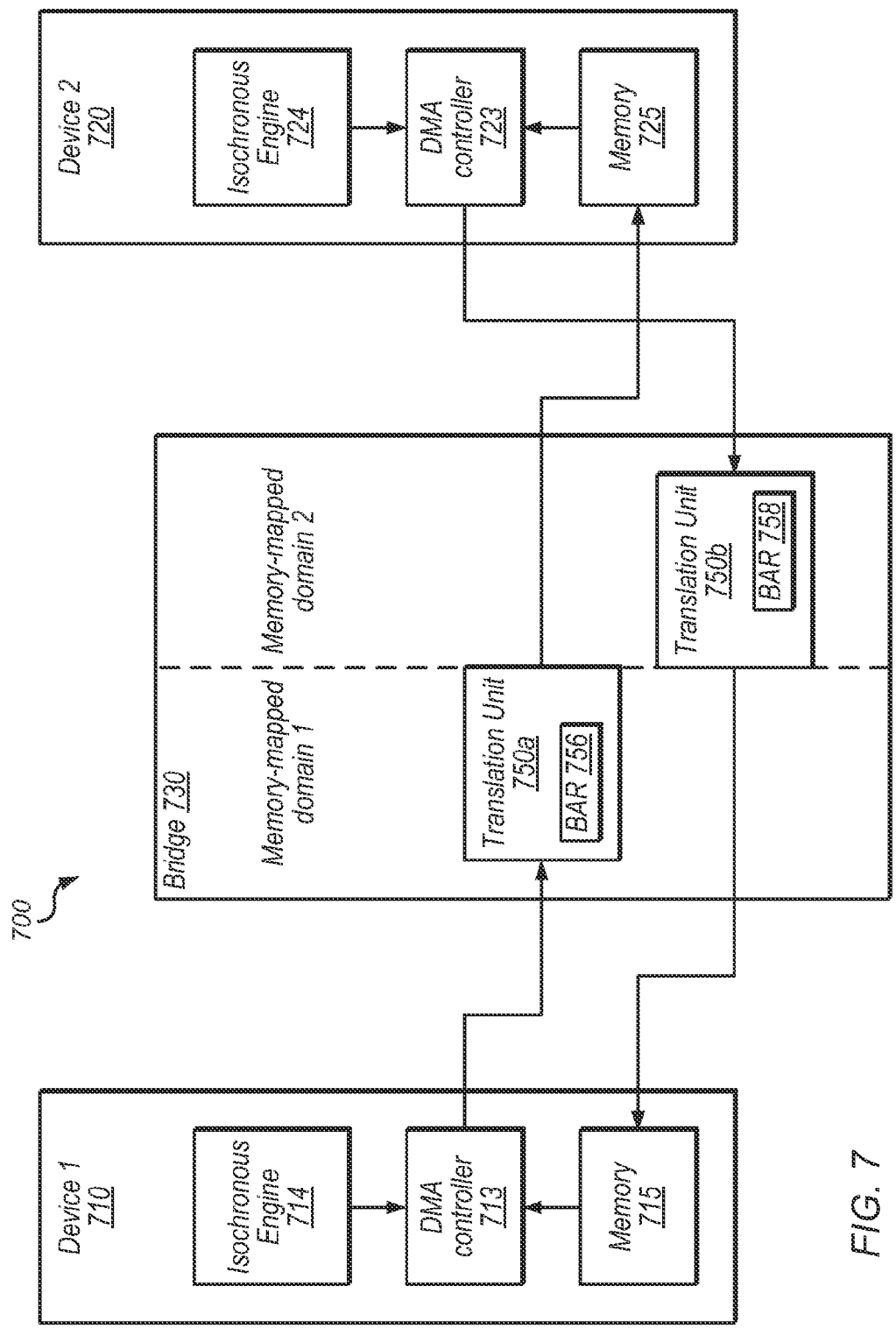
FIG. 7 is a block diagram illustrating one embodiment of an exemplary bridged system.

Referring now to FIG. 7, a block diagram illustrating one exemplary embodiment of a bridged system 700 is shown. System 700 includes device 1 710, device 2 720 and bridge 730. Device 1 and device 2 each include respective isochronous engines 714 and 724, DMA controllers 713 and 723, and memories 715 and 725. Bridge 730 separates memory-mapped domain 1 and memory-mapped domain 2 and includes translation units 750*a* and 750*b*. Translation units 750 may be separate entities or may be comprised in a single element as described above with reference to translation units 650 of FIG. 6.

In one embodiment, isochronous engine 714 is configured to control DMA controller 713 to transfer data in an isochronous manner during specified portions of successive cycles of one or more isochronous periods from memory 715 to memory 725 through translation unit 750*a*. Similarly, in the illustrated embodiment, isochronous engine 724 is configured to control DMA controller 723 to transfer data in an isochronous manner during specified portions of successive cycles of one or more isochronous periods from memory 725 to memory 715 through translation unit 650*b*.

The embodiment of FIG. 7 illustrates that an isochronous engine may be included in a device. Device 1 may be a host controller or an endpoint device. In one embodiment, device 2 does not include isochronous engine 724. In this embodiment, isochronous engine 714 may be configured to control one or more DMA controllers to isochronously transfer data between memory 715 and memory 725 (i.e., in both directions).

Figure 8:
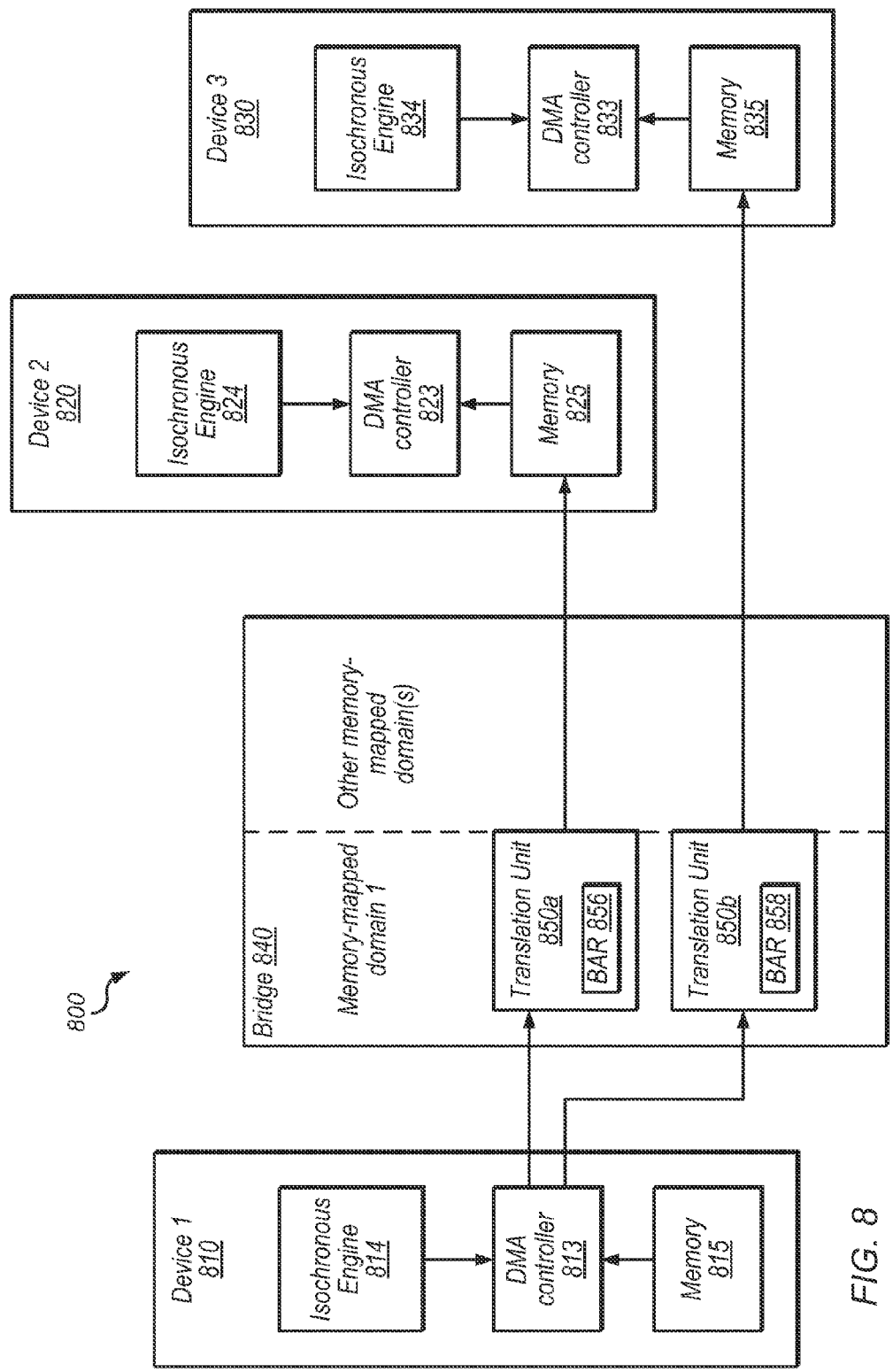
FIG. 8 is a block diagram illustrating another embodiment of an exemplary bridged system.

Referring now to FIG. 8, a system 800 illustrating another embodiment of a bridged system is shown. System 800 includes devices 810, 820, and 830 and bridge 840, which are coupled via a memory-mapped fabric. Device 1 includes isochronous engine 814, which is configured to initiate isochronous data transfer to multiple devices which may reside in multiple different memory-mapped domains. In the illustrated embodiment, isochronous engine 814 is configured with at least a first isochronous period and a second isochronous period. In this embodiment, isochronous engine 814 is configured to initiate transfer of data between memory 815 and memory 825 (e.g., by controlling DMA controller 813) at a specified point within successive cycles of the first isochronous period. Similarly, in this embodiment, isochronous engine 814 is configured to initiate transfer of data between memory 815 and memory 835 (e.g., by controlling DMA controller 813) at a specified point within successive cycles of the second isochronous period.

In the illustrated embodiment, bridge 840 may include one or more NTB's. For example, device 23 and device 3 may reside in different memory-mapped domains, in which case bridge 840 may include two NTB's. Alternately, device 2 and device 3 may reside in the same memory-mapped domain, in which case bridge 840 may include a single NTB. Translation units 850 may be separate entities or may be comprised in a single element as described above with reference to translation units 650 of FIG. 6.

Figure 9:
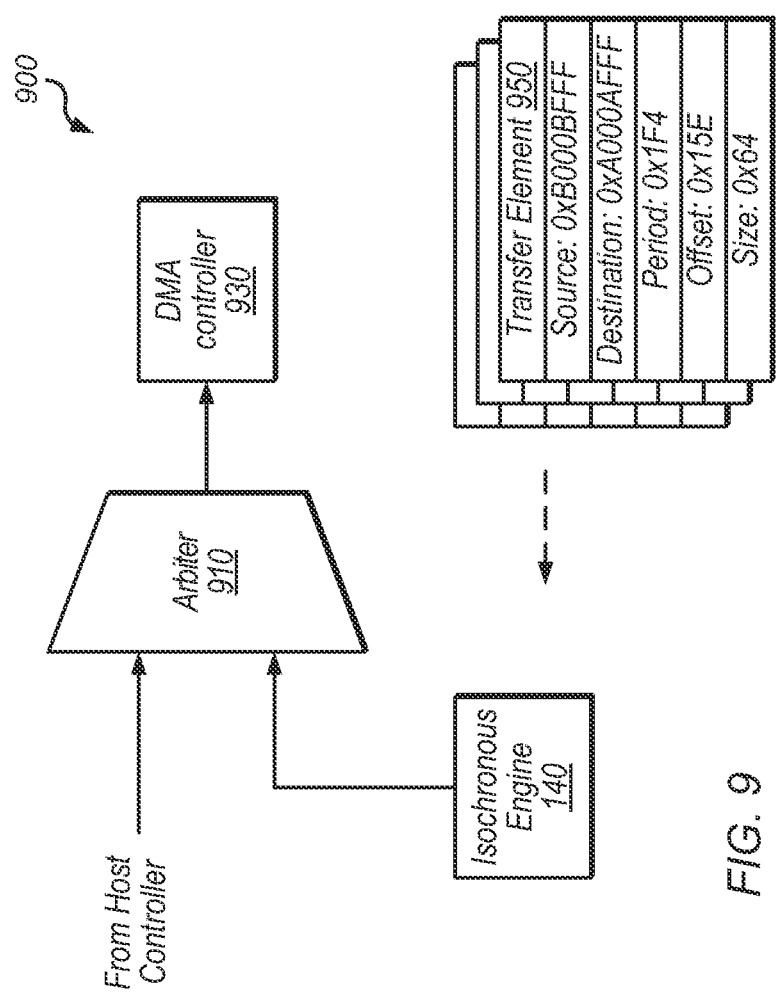
FIG. 9 is a block diagram illustrating one embodiment of exemplary configuration of an isochronous engine.

Referring now to FIG. 9, a block diagram illustrating one embodiment of a system 900 that includes an arbiter is shown. Arbiter 910 is a processing element (e.g., a circuit) that is configured to give priority for controlling DMA controller 930 to isochronous engine 140. For example, in some embodiments, isochronous engine 140 may be configured to control a DMA controller that is also coupled to a host controller. If the host controller controls the DMA controller during a portion of a cycle of an isochronous period when isochronous engine 140 is configured to initiate a data transfer, the isochronous nature of the transfer may be comprised (i.e., the transfer may be delayed, thus preventing data transfer according to the isochronous period). Therefore, in one embodiment, arbiter 910 is configured to give priority to isochronous engine 140 over other processing elements.

FIG. 9 also illustrates a transfer element 950. Transfer element 950 represents one embodiment of configuration information for isochronous engine 140. In the illustrated embodiment, transfer element 950 includes source and destination addresses for an isochronous transfer, a cycle time of the transfer, an offset of the transfer, and a size of the transfer. For example, transfer element 950 indicates a transfer of 64 bytes from source address 0xB000BFFF to destination address 0xA000AFFF starting at an offset of 0x15E time steps (e.g., clock cycles) within a cycle of an isochronous period of 0x1F4 time steps. Isochronous engine 140 may be configured with multiple transfer elements including multiple isochronous periods. Destination addresses related to transfers may be translated in order to correctly address devices in different memory-mapped domains, e.g., using a BAR.

In the illustrated embodiment, the portion of a cycle during which a transfer occurs is specified by the offset and the size of the transfer (which may correspond to the duration of the transfer). In another embodiment, the time duration of the transfer may be explicitly specified by transfer element 950.

In some embodiments, transfer element 950 may include configuration information for multiple transfers during cycles of a single isochronous period. In other embodiments, such configuration information may be split among multiple transfer elements. In various embodiments, any of various encodings, formats, and types of information may be used to configure isochronous engine 140, as desired.

Configuring an isochronous engine to control isochronous data transfer may free another processing element to perform other processing tasks. Further, data transfer by an isochronous engine may be more precise and reliable than data transfer by another processing element, e.g., because an isochronous engine may be rarely interrupted and may be dedicated to performing isochronous data transfers. Further, an arbiter such as arbiter 910 may further allow isochronous data transfers to be given priority in order to maintain an isochronous period for the transfers.

Figure 10:
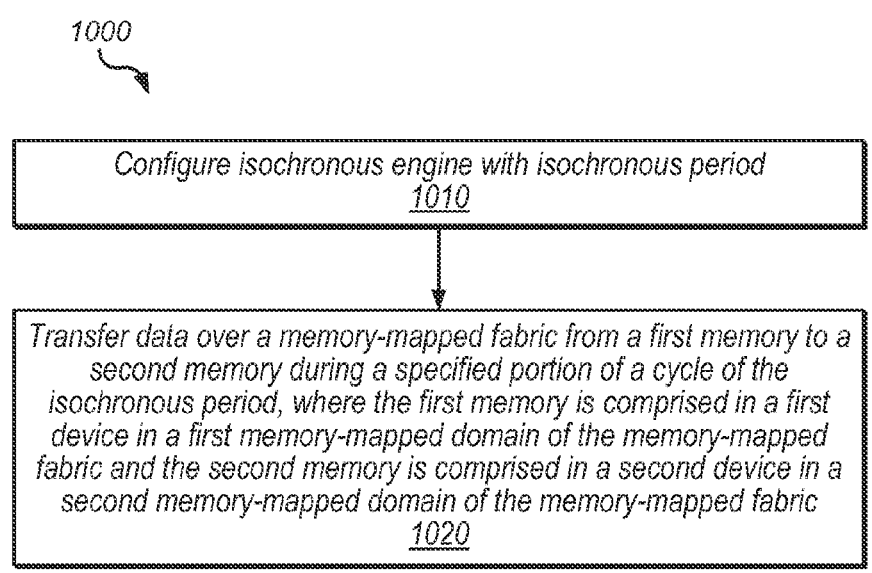
FIG. 10 is a flow diagram illustrating one embodiment of an exemplary method for isochronous data transfer between memory-mapped domains.

Referring now to FIG. 10, a flow diagram illustrating one exemplary embodiment of a method 1000 for real-time scheduling and execution of tasks is shown. The method shown in FIG. 10 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at block 1010.

At block 1010, an isochronous engine may be configured with an isochronous period. This configuring may be performed by a host controller or a peripheral device. In one embodiment, this configuring is performed by a device in the same memory-mapped domain as a processing element implementing the isochronous engine. The configuring may include providing parameters to the isochronous engine, such as those shown in transfer element 950. In some embodiments, the isochronous engine is configured to control multiple isochronous transfers, and is configured with multiple different isochronous periods. Note, however, that in some embodiments, one or more isochronous periods may be provided as default values, i.e., the isochronous engine may be (or have been) configured with default values for one or more isochronous periods, e.g., at a prior time. Flow proceeds to block 1020.

At block 1020, data may be transferred over a memory-mapped fabric from a first memory to a second memory during a specified portion of a cycle of the isochronous period, e.g., by the isochronous engine, possibly via control of a DMA controller. The first memory may be comprised in a first device in a first memory-mapped domain of the memory-mapped fabric and the second memory may be comprised in a second device in a second memory-mapped domain of the memory-mapped fabric. The data may be transferred from an isochronous buffer in the first memory to an isochronous buffer in the second memory. Translation of one or more addresses involved in the transfer (e.g., destination addresses) may be performed, e.g., by a NTB. The first device may be configured to write to the first memory (e.g., to an isochronous buffer in the memory) during a different specified portion of the cycle. The second device may be configured to read from the second memory (e.g., from an isochronous buffer in the memory) during another different specified portion of the cycle. The isochronous engine, the first device, and the second device may be synchronized to a global reference time, which may prevent data loss during the isochronous data transfer. Flow ends at block 1020.

Figure 11:
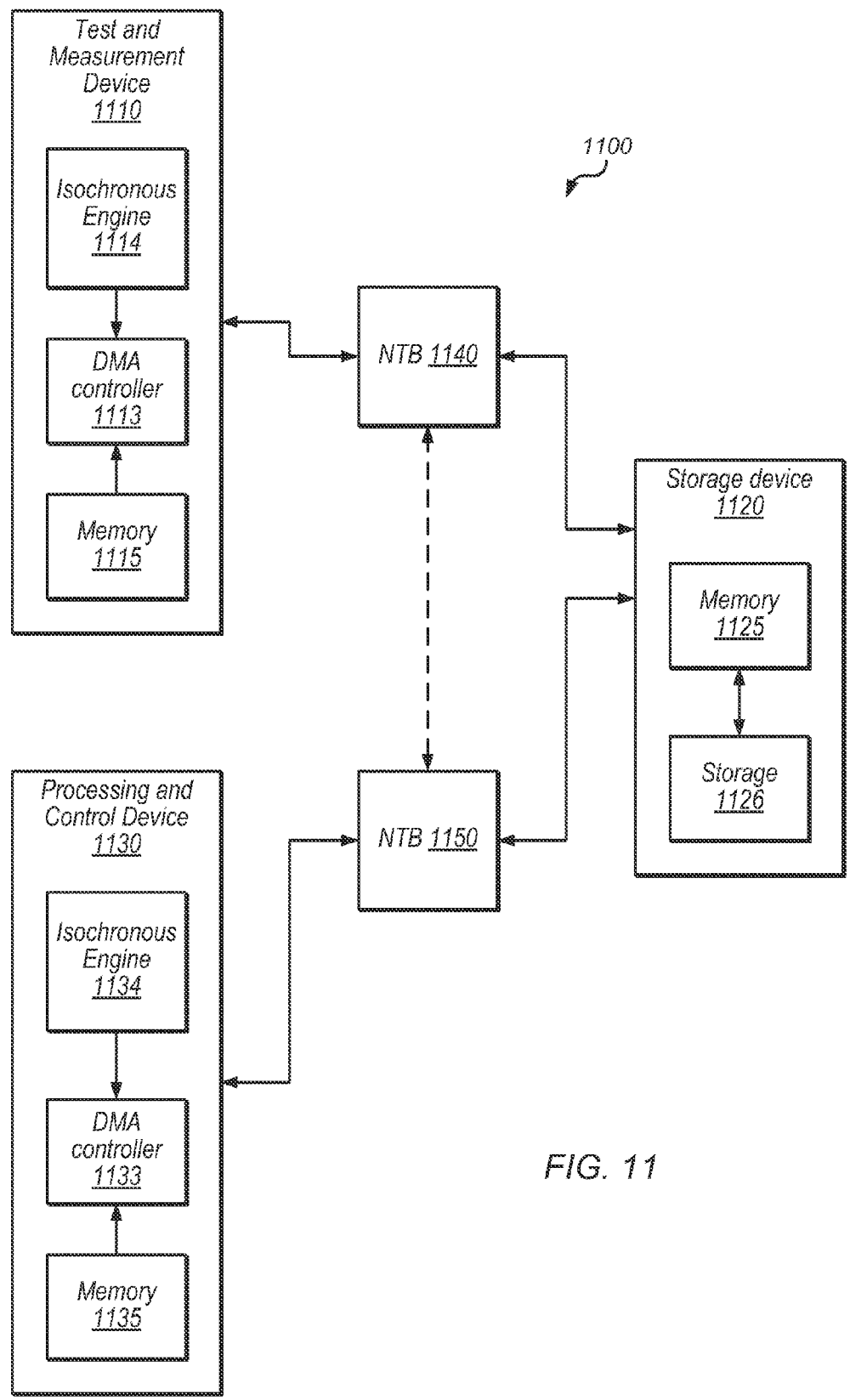
FIG. 11 is a block diagram illustrating one non-limiting embodiment of an exemplary test and measurement system.

Referring now to FIG. 11, one non-limiting embodiment of an exemplary test and measurement system 1100 is shown.

The system of FIG. 11 may represent one embodiment of the system of FIG. 2A. As shown, system 1100 includes test and measurement device 1110, storage device 1120, processing and control device 1130, and NTB's 1140 and 1150. In the illustrated embodiment, test and measurement device 1110 is configured to control testing of some unit under test and acquire data related to the test. For example, test and measurement device 1110 acquires data at a particular rate and stores the data in an isochronous buffer in memory 1115. In order not to lose data, isochronous engine 1114 transfers data from the isochronous buffer to memory 1125 during specified portions of cycles of an isochronous period. NTB 1140 may translate one or more addresses related to isochronous transfers from memory 1115 to memory 1125. NTB 1140 may be comprised in test and measurement device 1110 or a switch and NTB 1150 may be comprised in processing and control device 1130 or a switch, for example.

Storage device 1120 may transfer data from memory 1125 to storage 1126 for longer-term storage. For example, memory 1125 may be a smaller, volatile memory, and storage 1126 may be a larger, non-volatile memory.

Processing and control device 1130 may read data from memory 1125 and/or storage 1126 in an asynchronous or an isochronous manner. Processing and control device 1130 may process the data and, based on the data, send isochronous control data to test and measurement device 1110 (i.e., from memory 1135 to memory 1115). The isochronous period of the control data may have a longer period than the isochronous period of the measurement data sent from test and measurement device 1110 to storage device 1120. Test and measurement device 1110 may alter its operation based on the control data.

Note that in the embodiment shown, control data sent in an isochronous manner from memory 1135 to memory 1115 travels through two NTB's. NTB 1140 and 1150 may be coupled via the memory-mapped fabric, or data packets may travel through storage device 1120 to travel from NTB 1150 to NTB 1140 (e.g., through a root complex of storage device 1120). In various embodiments, data transferred in an isochronous manner may travel through any appropriate number of NTB's and/or memory-mapped domains. FIG. 11 illustrates one exemplary situation in which an isochronous engine may allow for reliable, isochronous data transfer between memory-mapped domains in a test and measurement system.

Exemplary Application: Time-Based Scheduling Architectures

Isochronous data transfer may be used in various time-based scheduling architectures such as time-triggered and scanning architectures, among others. For example, in one embodiment, isochronous data transfer is used to facilitate a scanning architecture in a distributed system with multiple memory-mapped domains. Scanning architectures are typically used for control-based programming models, which rely on real-time execution and minimal jitter. The control algorithms in such models may rely on the most recent data and may not require or rely on historical data (e.g., missed data may not be important).

Scanning architectures include an input/output (I/O) scan where an I/O scanning engine (or program) receives data from input channels (or memory buffers that have received data from coupled devices since the last I/O scan) and provides data on output channels (e.g., to coupled devices). The input channels may be located on the coupled devices themselves (e.g., when connected over a network) or on inputs/modules connected to the programmable controller (e.g., cards plugged into a PCIe bus of the programmable controller). As used herein, "channels" may refer to input or output channels (uni- or bi-directional, as desired) which provide input to or output from a controller in a scanning architecture.

Scanning architectures also may include a "program scan" where user tasks and/or programs are executed. These user programs typically use data received during the I/O scan (and/or execute in response to data received during the I/O scan) and may provide data to be transmitted during the next I/O scan. Typical scanning architectures execute periodically on a millisecond scale (among other scales, e.g., microseconds, seconds, etc.).

Accordingly, in some embodiments, one or more isochronous engines may be configured to transfer data between different memory-mapped domains in an isochronous manner based on one or more scanning frequencies utilized by a scanning architecture.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

We claim:

1. A method, comprising:
    configuring an isochronous engine with an isochronous period; and
    the isochronous engine initiating transfer of data over a memory-mapped switched fabric from a first memory to a second memory during a specified portion of a cycle of the isochronous period, wherein to transfer the data, the memory-mapped switched fabric translates memory addresses of the data in the first memory to corresponding addresses in the second memory; and
    the isochronous engine repeating said initiating transfer one or more times in an iterative manner to transfer successive data over the memory-mapped switched fabric from the first memory to the second memory during the specified portion of successive cycles of the isochronous period;
    wherein the first memory is comprised in a first device in a first memory-mapped domain of the memory-mapped switched fabric, and wherein the second memory is comprised in a second device in a second memory-mapped domain of the memory-mapped switched fabric.

2. The method of claim 1,
    wherein said transferring data includes the isochronous engine controlling a DMA controller to transfer the data; and
    wherein said translating is performed by a non-transparent bridge.

3. The method of claim 1, wherein the isochronous period is a first isochronous period, the method further comprising:
    configuring the isochronous engine with a second isochronous period; and
    the isochronous engine transferring second data over the memory-mapped switched fabric from the first memory to the second memory during a specified portion of a cycle of the second isochronous period;
    wherein the first isochronous period and the second isochronous period are different isochronous periods.

4. The method of claim 1, wherein the isochronous period is a first isochronous period, the method further comprising:
    configuring the isochronous engine with a third isochronous period; and
    the isochronous engine transferring third data over the memory-mapped switched fabric from the first memory to a third memory of a third device in a third memory-mapped domain of the memory-mapped switched fabric during a specified portion of a cycle of the third isochronous period.

5. The method of claim 1, wherein the isochronous engine, the first device, and the second device are synchronized to a global time.

6. The method of claim 1, wherein the first memory-mapped domain and the second memory-mapped domain correspond to different first and second clock domains.

7. The method of claim 1, further comprising:
    writing, by the first device, during a specified different portion of the cycle of the first isochronous period, to the first memory.

8. The method of claim 1, further comprising:
    reading, by the second device, during a specified different portion of the cycle of the first isochronous period, from the second memory.

9. The method of claim 1, wherein the isochronous engine is a first isochronous engine associated with the first memory-mapped domain, and wherein a second isochronous engine is associated with the second memory-mapped domain, the method further comprising:
    configuring the second isochronous engine with a second isochronous period; and
    the second isochronous engine transferring second data over the memory-mapped switched fabric from the second memory to the first memory during a specified portion of a cycle of the second isochronous period.

10. The method of claim 1, wherein the isochronous engine is implemented by the first device.

11. An apparatus, comprising:
    at least one I/O port, configured to couple to a memory-mapped switched fabric; and
    a processing element, coupled to the at least one I/O port, configured to implement an isochronous engine, configured to:
        initiate a transfer of data over the memory-mapped switched fabric from a first memory to a second memory, at a specified point within a cycle of an isochronous period, wherein to transfer the data, the memory-mapped switched fabric translates memory addresses of the data in the first memory to corresponding addresses in the second memory; and
        repeat said initiating transfer of successive data one or more times in an iterative manner over the memory-mapped switched fabric from the first memory to the second memory at the specified point within successive cycles of the isochronous period;
        wherein the first memory is comprised in a first device in a first memory-mapped domain of the memory-mapped switched fabric, and wherein the second memory is comprised in a second device in a second memory-mapped domain of the memory-mapped switched fabric.

12. The apparatus of claim 11, further comprising:
a direct memory access (DMA) controller;
wherein, to initiate the transfer of data, the isochronous engine is configured to control the DMA controller to transfer the data.

13. The apparatus of claim 12, further comprising an arbiter circuit configured to give priority for controlling the DMA controller to the isochronous engine.

14. The apparatus of claim 11, wherein the apparatus is the first device.

15. The apparatus of claim 11, wherein the apparatus is an endpoint device in the first memory-mapped domain.

16. The apparatus of claim 11, wherein the apparatus is a host controller in the first memory-mapped domain.

17. The apparatus of claim 11,
wherein the apparatus is a non-transparent bridge directly coupled to the first memory-mapped domain and the second memory-mapped domain; and
wherein the apparatus is configured to translate one or more addresses related to the transfer.

18. The apparatus of claim 17,
wherein the isochronous engine comprises a first isochronous engine associated with the first memory-mapped domain, wherein the first isochronous engine is configured to control isochronous data transfer from the first memory to the second memory; and
wherein the apparatus is configured to implement a second isochronous engine associated with the second memory-mapped domain, wherein the second isochronous engine is configured to control isochronous data transfer from the second memory to the first memory.

19. The apparatus of claim 11, wherein the first device is configured to configure the isochronous engine with the isochronous period.

20. The apparatus of claim 11, wherein the isochronous engine is further configured to initiate a second transfer of data over the memory-mapped switched fabric from the first memory to the second memory, at a specified point within a cycle of a second isochronous period.

21. The apparatus of claim 11, wherein the apparatus, the first device and the second device are synchronized to a reference clock.

22. The apparatus of claim 11, wherein the first memory-mapped domain and the second memory-mapped domain correspond to different first and second clock domains.

23. The apparatus of claim 11,
wherein the first device is configured to write, during a first different portion of the cycle of the isochronous period, to the first memory; and
wherein the second device is configured to read, during a second different portion of the cycle of the isochronous period, from the second memory.

24. A system comprising:
a first device and a second device;
a non-transparent bridge;
a processing element configured to implement an isochronous engine; and
at least one DMA controller;
wherein the first and second devices and the non-transparent bridge are coupled via a memory-mapped switched fabric;
wherein the first device resides in a first memory-mapped domain of the memory-mapped switched fabric and the second devices resides in a second memory-mapped domain of the memory-mapped switched fabric; and
wherein the isochronous engine is configured to control the at least one DMA controller for isochronous data transfer from the first device to the second device over the memory-mapped switched fabric via the non-transparent bridge, and wherein to transfer the data, the non-transparent bridge translates memory addresses of the data in the first memory to corresponding addresses in the second memory.

25. The system of claim 24, further comprising:
a second processing element configured to implement a second isochronous engine associated with the second memory-mapped domain;
wherein the second isochronous engine is configured to control the at least one DMA controller for isochronous data transfer from the second device to the first device via the memory-mapped switched fabric.

26. The system of claim 24, wherein the processing element configured to implement the isochronous engine is included in the non-transparent bridge.

27. The system of claim 24, wherein the processing element configured to implement the isochronous engine is included in the first device.

28. The system of claim 24, further comprising:
a third device, wherein the third device resides in the first memory-mapped domain;
wherein the processing element configured to implement the isochronous engine is included in the third device.

* * * * *